Figure 10:
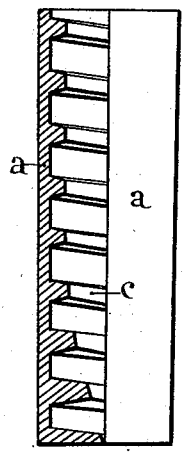

G. LAKHOVSKY.
LINER FOR USE IN FIXING SCREW SPIKES IN RAILWAY SLEEPERS.
APPLICATION FILED JAN. 19, 1910.
1,028,743.
Patented June 4, 1912.
2 SHEETS—SHEET 1.
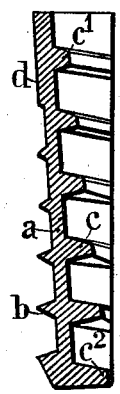
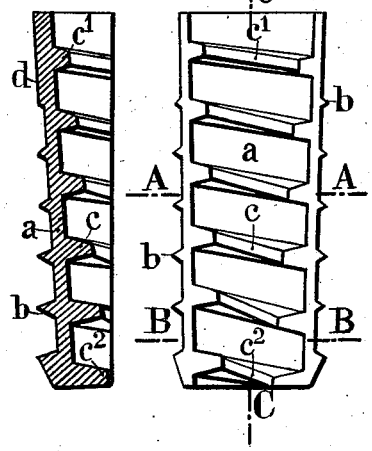
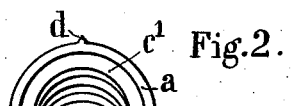
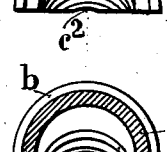
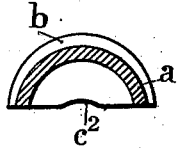
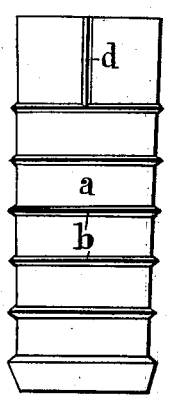
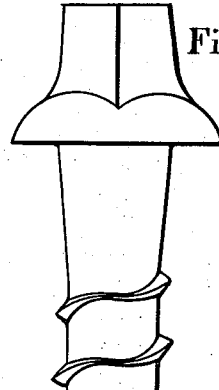
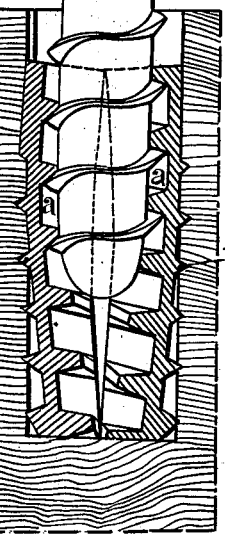
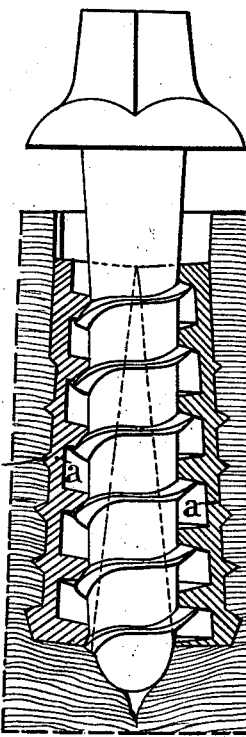
INVENTOR
Georges Lakhovsky
BY
ATTORNEYS G. LAKHOVSKY.
LINER FOR USE IN FIXING SCREW SPIKES IN RAILWAY SLEEPERS.
APPLICATION FILED JAN. 19, 1910.

1,028,743.

Patented June 4, 1912.

2 SHEETS—SHEET 2.

WITNESSES

INVENTOR
Georges Lakhovsky
BY
ATTORNEYS

UNITED STATES PATENT OFFICE.

GEORGES LAKHOVSKY, OF PARIS, FRANCE.

LINER FOR USE IN FIXING SCREW-SPIKES IN RAILWAY-SLEEPERS.

1,028,743. Specification of Letters Patent. Patented June 4, 1912.

Application filed January 19, 1910. Serial No. 538,834.

*To all whom it may concern:*

Be it known that I, GEORGES LAKHOVSKY, a subject of the Russian Empire, and a resident of 5 Avenue du Bois de Boulogne, in the city of Paris, Republic of France, have invented Improvements in Liners for Use in Fixing Screw-Spikes in Railway-Sleepers, of which the following is a full, clear, and exact description.

The present invention has for its object an improved liner for fixing screw spikes in railway sleepers.

Several systems of liners have been suggested, some of these comprising a single piece while others comprise two or more parts, presenting internally a screw-thread in which the spike is screwed and externally projections intended to enter into the wood of the sleeper, but none of these systems have given satisfactory practical results, either for the reason that the liner has opposed to the screw spike such a resistance that the screw threads of the latter were injured or that it was impossible to screw completely this spike, or because the shells became out of shape in an irregular manner and that in consequence of this deformation the screw thread failed to register throughout its length with the liner and that there was a play between the outer surface of the shells and the wood of the sleeper.

The present form of liner is essentially characterized by this fact that each of its two constituent shells has throughout its height a relatively small thickness and presents internal portions of helicoidal screw threads of increasing height, the pitch of which is equal to that of the spike and presenting an arc-shaped edge, the curve of this edge having a radius equal to that of the stem of the spike. Besides, each of these shells is provided externally with transverse projections also of increasing height.

By means of its special combination, this liner has the advantage of presenting throughout its height a sensibly constant and relatively small resistance; in these conditions, when screwing down the spike, this liner, held externally by the wood of the sleeper, is regularly distorted and opens in proportion to the screwing down of the spike; its portions of helicoidal threads fit very exactly on the sensibly cylindrical body of this spike and remain in engagement with the screw thread of the latter; its external surface takes progressively a downwardly flared shape and the nearer the transverse projections of the liner lie toward the base the more they are inserted in the wood of the sleeper. This device insures therefore the perfect fixing of the spike, since the liner, after the spike has been screwed, is pressed forcibly throughout its height against the body of the latter and that by its downwardly flared shape, and by its increasing projections it cannot be displaced in the sleeper.

The accompanying drawings show by way of example this improved liner.

Figure 13:
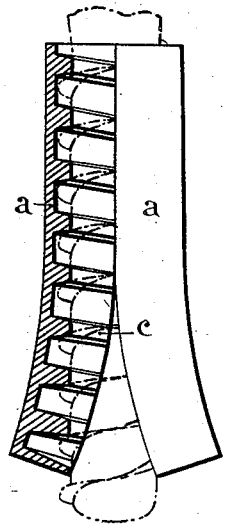
Figure 11:
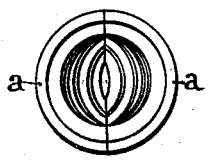
Figure 14:
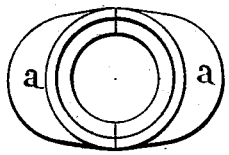
Figure 12:
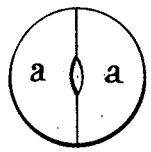
Figure 15:
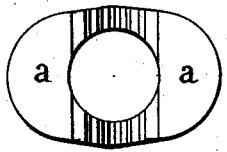

Figure 1 shows in elevation the internal face of one of the shells. Fig. 2 is a bottom plan view of this shell. Figs. 3 and 4 are two cross sections made respectively on lines A—A and B—B of Fig. 1. Fig. 5 shows in elevation the external face of the shell. Fig. 6 is a vertical section made according to line C—C of Fig. 1. Fig. 7 shows the liner in position in the sleeper before the insertion of the screw-spike. Fig. 8 shows the distortion of the liner during the screwing down of the spike. Fig. 9 represents the position of the liner after the insertion of the spike. Figs. 10 to 15 show a modification of the present form of liner; Fig. 10 represents the liner before the insertion of the spike, one of the shells being in elevation and the other in vertical section; Figs. 11 and 12 show respectively this liner in top and bottom views; Fig. 13 illustrates the liner after the insertion of the spike, one of the shells being in vertical section and the other in elevation; Figs. 14 and 15 are top and bottom views corresponding to Fig. 13.

As illustrated in Figs. 1 to 9, the present liner consists of two shells independent from one another, having a relatively small and nearly constant thickness throughout their height. The body *a* of each shell has externally a semi-truncated convex shape and presents transverse ribs *b* of circular shape and preferably with a sharp edge. These ribs make projections which increase in height progressively from the top to the bottom of the shell; these projections are in parallel planes, as shown in Fig. 5, or can be helicoidal. The projections and the radius of these ribs *b* are so proportioned that the edges of these different ribs are placed, when the two shells are applied one against the other, on the generatrices of a cylinder the diameter of which is equal or slightly greater than that of the hole made in the sleeper and in which the liner is to be inserted.

Each shell presents on its inner face a series of helical screw threads $c$; the projections of these screw threads are different; they increase progressively from the top to the bottom of the shell but their concavities have, preferably, a radius of uniform curve equal to the radius of the spike body.

By reason of the increasing depth of the screw threads, the arcs and pitches of these concavities diminish progressively, as illustrated in Figs. 2 and 6. The arc of the concavity of the upper screw thread $c$ of the shell is of about 180°, while the arc of the concavity of the lower screw thread $c^2$ (Figs. 2 and 4) is only of a few degrees. This arc could even be null in the case of this latter screw thread would not present any concaveness and would have a rectilinear edge. In these conditions, the inner edges of the screw threads $c$ are placed on generatrices inclined relatively to the axis when the two shells are applied the one against the other, before the insertion of the spike.

One of the shells, or each of them, is provided with, preferably, a longitudinal rib $d$ starting from its lower end; this rib is intended to prevent any rotation of the liner during the screwing down of the spike.

This liner is placed in position in the following manner: After having bored or rebored the hole in the sleeper to a suitable diameter, the two shells applied the one against the other are forced therein by means of an appropriate tool which is driven by the aid of a hammer until the upper end of this liner has descended slightly beneath the surface of the sleeper, as shown in Fig. 7. When the liner is thus inserted in the sleeper, the spike is screwed down between the two shells.

In proportion to the descent of the spike, the latter exerts stresses on the progressively increasing threads $c$; the two shells retained externally by the wood of the sleeper, are regularly distorted, as illustrated in Fig. 8; by reason of the small thickness of the body of these shells, the threads $c$ take progressively the shape of the cylindrical body of the spike and are pressed more and more against the cylindrical body of the spike under the action of the resistance opposed by the wood of the sleeper; the two shells are spread apart by degrees; then the liner takes a downwardly flared shape (Fig. 9) and the nearer the progressively increasing external ribs $b$ lie toward the base of this liner the more they are inserted in the wood of the sleeper. In these conditions, the two shells are energetically applied throughout their height against the body of the spike; the liner cannot take any displacement in the wood by reason of its flared shape and of its progressive anchoring; this liner being thus held absolutely from movement on the one hand by engagement with the spike and on the other hand with the sleeper, insures the perfect binding of this spike in the latter. Besides, it is to be noted that this form of liner closes completely the orifice of the hole in the sleeper; consequently, water cannot enter between the liner and the wood.

The present system of liner permits the use of old spikes which are actually thrown aside, even in the case the screw-threads of these spikes are very blunt. The arrangement of the screw-threads of increasing depth is particularly advantageous in this case. The present form of liner has also the advantage when old spikes with blunt threads are screwed therein to straighten and polish the thread of these spikes.

Figs. 10 to 15 illustrate a modification of this form of liner which does not present externally any transverse rib. The body $a$ of each shell has externally a semi-cylindrical or very slightly conical shape and its external face is smooth or grooved. This body $a$ is provided internally as previously mentioned, with threads $c$ of increasing height. The lower threads of this liner must have a greater height than in the case in which the shells present increasing external projections; the lower parts of these shells will therefore spread apart to a greater extent, during the insertion of the spike, as shown in Fig. 13; consequently, the body of these shells must have a sufficiently reduced thickness in order to give to these shells the required flexibility. The increasing threads $c$ can start from the top of the shell or from any point of the latter, as shown in Figs. 10 and 13. This form of liner with a smooth or grooved external surface, is particularly advantageous in case the liner is to be inserted in sleepers made of soft wood, as, on the one hand, the external surface being smooth, the wood is not subjected to any shearing and on the other hand the very flared shape of the liner at its lower part opposes a considerable resistance to the tearing action.

The present form of liner can be made by molding or by rolling.

Claim:

A liner for securing screw spikes in railway sleepers, comprising two independent semi-cylindrical shells, each provided internally with a helicoidal screw thread having the same pitch as the screw thread of the screw spike with which it is to be used and the projection of which on the inner face of the shell increases progressively from the top to the bottom, each of the shells being semi-circular in shape at its upper edge and having its longitudinal edges inclined in such a manner that the transverse section of the shell has a development progressively diminishing from the top to the bottom, each shell having externally smooth portions and spaced transverse ribs of such increasing height that the sharp edges of the ribs are limited in the median plane of the shell by a line parallel to the inclination of the longitudinal edges.

The foregoing specification of my improvements in liners for use in fixing screw spikes in railway sleepers signed by me this 4th day of January 1910.

GEORGES LAKHOVSKY.

Witnesses:
H. C. COXE,
R. EHIRIOT.

Copies of this patent may be obtained for five cents each, by addressing the "Commissioner of Patents, Washington, D. C."